(12) United States Patent
King

(10) Patent No.: US 8,145,016 B1
(45) Date of Patent: Mar. 27, 2012

(54) SYSTEM FOR THE ENVIRONMENTAL VIEWING OF AN OUTDOOR AD SPACE

(76) Inventor: Joan King, Pensacola, FL (US)

( * ) Notice: Subject to any disclaimer, the term of this patent is extended or adjusted under 35 U.S.C. 154(b) by 820 days.

(21) Appl. No.: 12/290,271

(22) Filed: Oct. 28, 2008

(51) Int. Cl.
*G06K 9/00* (2006.01)
(52) U.S. Cl. .................. 382/305; 707/918; 705/14.4
(58) Field of Classification Search .............. 382/100, 382/104, 305; 705/14.4, 14, 41, 14.45, 14.49, 705/14.5, 14.62, 14.63, 14.72; 707/803, 707/804, 918, E17.004, E17.019, E17.026
See application file for complete search history.

(56) References Cited

U.S. PATENT DOCUMENTS

| 5,508,737 | A |  | 4/1996 | Lang .............................. 348/159 |
|---|---|---|---|---|
| 6,282,362 | B1 |  | 8/2001 | Murphy et al. ................. 386/46 |
| 6,532,345 | B1 |  | 3/2003 | Gluck ........................... 396/427 |
| 7,254,249 | B2 |  | 8/2007 | Rhoads et al. ................ 382/100 |
| 2003/0202683 | A1 | * | 10/2003 | Ma et al. ....................... 382/104 |
| 2009/0132316 | A1 | * | 5/2009 | Florance et al. .................. 705/7 |
| 2010/0208937 | A1 | * | 8/2010 | Kmiecik et al. .............. 382/100 |

* cited by examiner

*Primary Examiner* — Andrew W Johns
(74) *Attorney, Agent, or Firm* — Peter Loffler

(57) ABSTRACT

A system whereby a potential advertiser can see a motorist's view of an outdoor ad space without the need to actually drive past the outdoor ad space. A video image is recorded of the outdoor ad space from a vehicle driving past the outdoor ad space using a video recorder. A database is populated with images of each outdoor ad space. An advertiser queries the database using some identifier in order to retrieve the image and once retrieved, view the image.

16 Claims, 2 Drawing Sheets

SYSTEM FOR THE ENVIRONMENTAL VIEWING OF AN OUTDOOR AD SPACE

BACKGROUND OF THE INVENTION

1. Field of the Invention

The present invention relates to a system whereby an advertiser can view the eyeball appearance from a motorist's perspective of an outdoor ad space with the advertiser being located remote of the outdoor ad space.

2. Background of the Prior Art

Outdoor ad spaces, such as billboards, bus benches, bus stops, etc., are an effective advertising medium for many types of goods and services. The large signs, which may be either static or dynamic, are observed by a relatively captive audience of passing motorists that reliably drive by daily.

Typically, when a salesperson is seeking to sell outdoor ad space to a prospective client, the salesperson speaks in the number of vehicles that pass by the outdoor ad space at issue, such vehicle counts typically obtained from the state's transportation department or other sources. Knowing approximately how many vehicles pass by the outdoor ad space on a daily or weekly basis, the client is able to make an informed decision as to the value obtained by renting space on the outdoor ad space.

Although knowing approximately how many eyeballs will view a given outdoor ad space during a given time period is an important piece of information, another item of information is required to determine whether a given outdoor ad space is a proper investment for the client's advertising dollars. A client needs to know what the view of the outdoor ad space is. That is, what does the motorist and his or her passengers see when driving past the outdoor ad space. Is the outdoor ad space in an open area on a straight section of highway so that the outdoor ad space can be studied by the motorists for several seconds prior to the ad space being passed, or is the outdoor ad space located on a curve and obstructed by another object such as a building, a tree or another outdoor ad space so that the motorist only has a fractional moment to take being offered by the message of the outdoor ad space.

If the client is local relative to the outdoor ad spaces under consideration, then the client can simply drive by each outdoor ad space being considered and see each outdoor ad space for themselves. While this gives the client the so-called bird's eye view of each outdoor ad space, an entire day and tank of gas can be expended in this manner. More problematic is the national account client that is seeking outdoor ad space in one or more locales that are remote from the decision maker's location. In such a scenario, seeing each outdoor ad space first hand is impractical. The salesperson of the outdoor ad space alleviates this situation by presenting photographs of each outdoor ad space under consideration. However, like the real estate agent photographing the property to be sold, the outdoor ad space salesperson strives to have the most flattering photograph of each outdoor ad space, which photograph may not be entirely representative of a motorist's experience with the outdoor ad space.

What is needed is a system whereby a potential outdoor ad space advertiser can gain a sense of a motorist's experience of a given outdoor ad space without the need to for the advertiser to actually drive past the outdoor ad space. Such a system must be relatively simple in design so as to be cost-effective and be easy to operate so that a advertiser can arrive at an informed advertising decision in relatively short order.

SUMMARY OF THE INVENTION

The system for the environmental viewing of an outdoor ad space of the present invention allows a potential outdoor ad space advertiser to be able to gain a sense of what a motorist (potential customer of the advertiser) experiences while passing a given outdoor ad space in order to gauge the effectiveness of the outdoor ad space as an advertising medium. The system for the environmental viewing of an outdoor ad space allows the advertiser to view each outdoor ad space from the comfort of his or her own office thereby removing the need (and its attendant costs both in time and fuel) to travel to each outdoor ad space site. The system for the environmental viewing of an outdoor ad space is of relatively simple design and is relatively easy to use.

The system for the environmental viewing of an outdoor ad space comprises the steps of providing an image capturing device and recording an image of the outdoor ad space via the image capturing device from a vehicle that is driving past the outdoor ad space. A database is populated with several entries, each entry having an image of the outdoor ad space so captured and one or more identifiers associated with the entry in order to retrieve the image from the database during a database query using the identifiers. The image is displayed on an output device whenever the identifier is queried against the database, the output device being any appropriate video display device such as a computer screen. The one or more identifiers may also be displayed on the output device along side the image as may be a traffic count number of the number of vehicles that drive past the outdoor ad space during a given time period. The time period may be further refined. The identifier may be selected from the group comprising a physical address description, an identification code, and a GPS coordinate.

BRIEF DESCRIPTION OF THE DRAWINGS

Similar reference numerals refer to similar parts throughout the several views of the drawings.

DESCRIPTION OF THE PREFERRED EMBODIMENT

Figure 1:
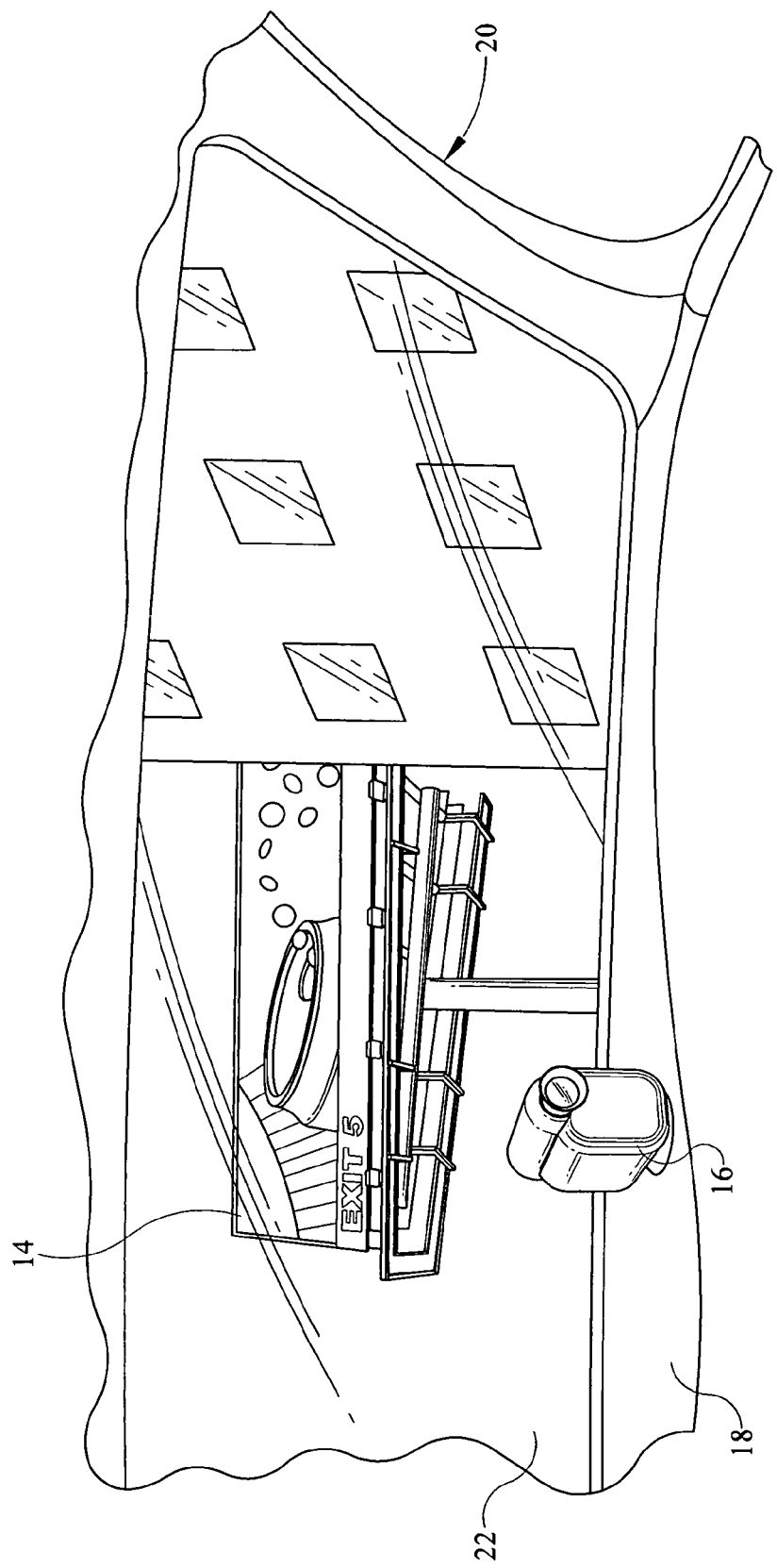
FIG. 1 is a perspective view of the image capturing process used for the system for the environmental viewing of an outdoor ad space.

Referring now to the drawings, it is seen that the system for the environmental viewing of an outdoor ad space of the present invention involves capturing video images 12 of each outdoor ad space 14 within a salesperson's outdoor ad space portfolio. To capture each image 12, a video camera 16 is mounted onto a dashboard 18 or other suitable location of a vehicle 20 (or may be held by a passenger within the vehicle 20), the video camera 16 pointing outwardly through the front windshield 22 of the vehicle 20. The video camera 16 records as each outdoor ad space 14 is driven past so as to capture an image 12 that approximates what a motorist sees when driving pass the outdoor ad space 14. The length of the image to capture is decided by the operator and may be from the time the outdoor ad space 14 can be seen to the time the outdoor ad space 14 cannot be seen, however, the image 12 may run from prior to the outdoor ad space 14 coming into view to after the outdoor ad space 14 is out of view in order to give the client a sense of the area whereat a particular outdoor ad space 14 is located. The operator of the video camera 16 notes what outdoor ad space 14 is associated with each video clip being recorded. Such outdoor ad space location may be via physical location of the outdoor ad space 14, may be some internal identifying code associated with each outdoor ad space 14, or may be by GPS (Global Positioning System) coordinates of the outdoor ad space 14. The GPS coordinates can be captured manually either from a GPS-based navigation device installed within the vehicle 20 or via a hand-held GPS device (neither illustrated) or, as some video cameras come equipped with GPS chips that tag the GPS coordinates to the image being recorded, the video camera 16 itself can capture the GPS coordinates of the outdoor ad space 14 being recorded.

Each image 12 that is recorded is downloaded into an appropriate database with each image 12 being retrievable from the database via an appropriate identifier.

Figure 2:
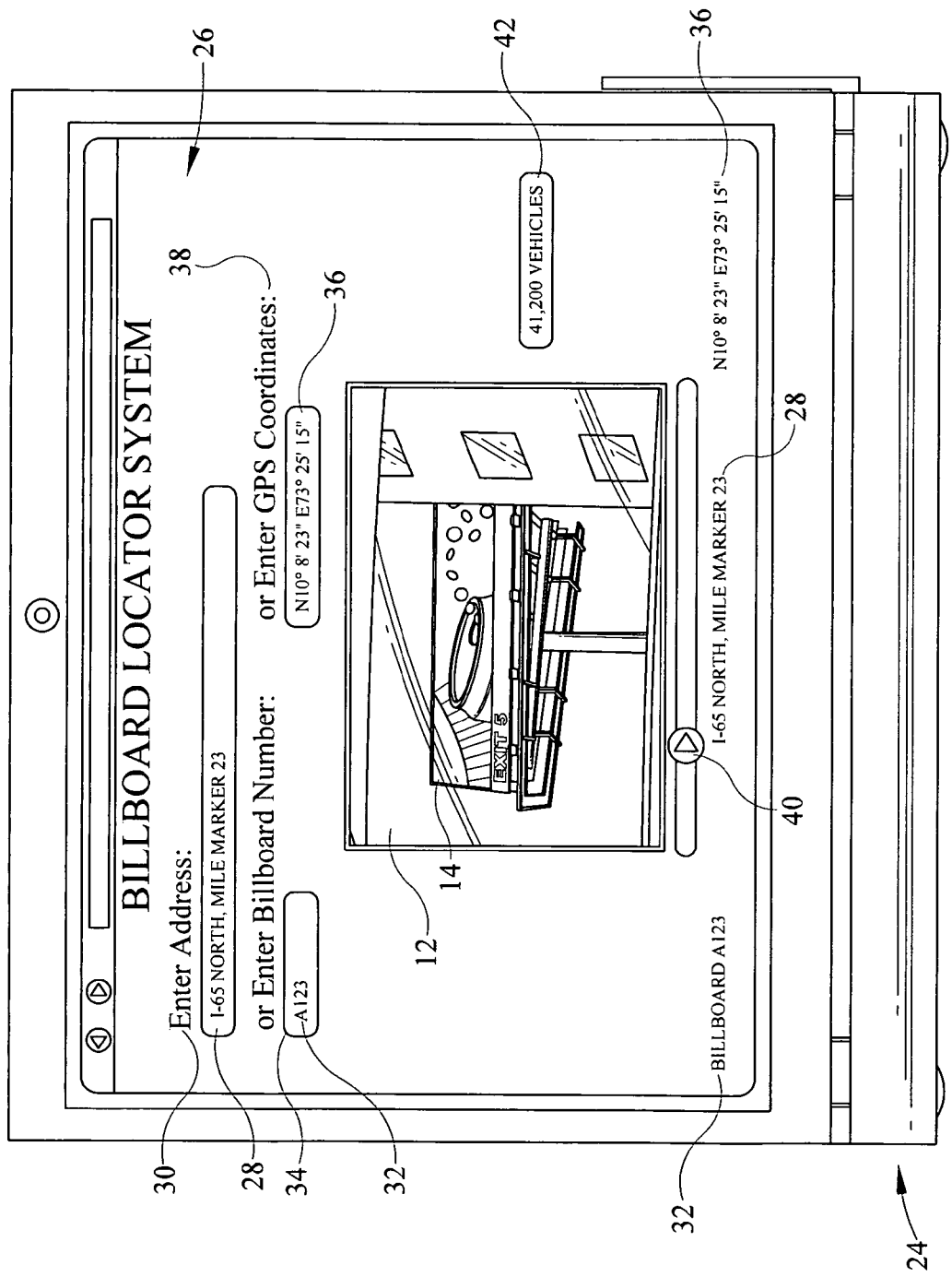
FIG. 2 is an exemplary screen view used by a client utilizing the system for the environmental viewing of an outdoor ad space.

A client logs onto the system for the environmental viewing of an outdoor ad space on his or her computer 24 in some appropriate fashion and is taken to a screen 26 wherein images 12 of the various outdoor ad spaces 14 can be retrieved and viewed. The client enters either the physical location 28 in an address box 30, which physical location 28 can be a roadway name and a mile marker or cross street or even a roadway name and a landmark, such as Main Street at the baseball park. The client may enter only a roadway name 28 and have all of the images 12 that are on that particular roadway retrieved with possible further refinement to a section of the roadway if the roadway is long or has a high number of outdoor ad spaces 14 therealong. The database search engine also performs best match searches so that if in the example shown in FIG. 2, of I-65 at mile marker 23 is entered, yet the database is not populated with such an entry, the search engine retrieves one or more near matches so that the system returns an image of an outdoor ad space 14 at mile marker 22 and another image of an outdoor ad space 14 at mile marker 25, for example, allowing the client to view the desired image 12 or both images 12 as desired. Alternately, an identification code 32 is entered in an identifier box 34 that identifies the outdoor ad space 14 under consideration by some identifier 32 provided by the salesperson and the appropriate image 12 retrieved via this identifier 32. When the identifier 32 is entered into the identifier box 34, an optional pop-up balloon can be displayed that gives the physical location of the outdoor ad space 14 about to be retrieved by the client so as to verify to the client that the correct image 12 is about to be retrieved. Alternately, GPS coordinates 36 can be entered into a GPS coordinate box 38 and the database is searched via such coordinates 36, again performing a best match type of retrieval.

Once the appropriate outdoor ad space identifier (physical location 28, identification code 32, or GPS coordinates 36) is entered, the database is searched via the identifier and the appropriate image 12 retrieved. If more than one image 12 is retrieved, then an intermediate screen (not illustrated) is displayed, which intermediate screen displays all of the database output resulting from the input query, possibly with a representative thumbnail of each image 12 retrieved, allowing the client to select a particular image 12. Thereafter, the image 12 is viewed on the screen 26 of the computer 24. The image 12 can be manipulated (play, stop, pause, rewind, etc., in the usual way using typical control buttons 40. Other information may be displayed on the screen 26 such as the identifier 32, the physical location 28, and/or the GPS coordinates 36. Additionally, a traffic count number 42 can be displayed in order to allow the client to know approximately how many vehicles 20 pass the outdoor ad space 14 under consideration in a given time period. The traffic count number 40 can be further refined into smaller time periods if desired. For example, an entrepreneur running a coffee and donut shop is far more interested in the vehicle counts between, say 6:00 AM to 9:00 AM (breakfast time) than overall daily counts.

The client views each desired image 12 in turn in order to make a more informed decision as to what outdoor ad spaces 14 to advertise upon. Of course, if the client is local, the client can physically go to each prospective location identified by the system for the environmental viewing of an outdoor ad space in order to gather even more information.

While the invention has been particularly shown and described with reference to an embodiment thereof, it will be appreciated by those skilled in the art that various changes in form and detail may be made without departing from the spirit and scope of the invention.

I claim:

1. A method for viewing an item comprising the steps:
   providing an image capturing device;
   recording an image of the item via the image capturing device from a vehicle that is driving past the item;
   populating a database entry with the image, the entry having an identifier associated with the entry in order to retrieve the image from the database during a database query; and
   displaying the image on an output device whenever the identifier is queried against the database.

2. The method as in claim 1 wherein the output device is a computer screen.

3. The method as in claim 1 wherein the identifier is displayed on the output device along side the image.

4. The method as in claim 1 further comprising the step of displaying a traffic count number on the output device along side the image.

5. The method as in claim 1 wherein the identifier is a physical address description.

6. The method as in claim 1 wherein the identifier is an identification code.

7. The method as in claim 1 wherein the identifier is a GPS coordinate.

8. The method as in claim 1 wherein the identifier is selected from the group consisting of a physical address description, an identification code, and a GPS coordinate.

9. A method for viewing an outdoor ad space comprising the steps:
   providing an image capturing device;
   recording an image of the outdoor ad space via the image capturing device from a vehicle that is driving past the outdoor ad space;
   populating a database entry with the image, the entry having an identifier associated with the entry in order to retrieve the image from the database during a database query; and
   displaying the image on an output device whenever the identifier is queried against the database.

10. The method as in claim 9 wherein the output device is a computer screen.

11. The method as in claim 9 wherein the identifier is displayed on the output device along side the image.

12. The method as in claim 9 further comprising the step of displaying a traffic count number on the output device along side the image.

13. The method as in claim 9 wherein the identifier is a physical address description.

14. The method as in claim 9 wherein the identifier is an identification code.

15. The method as in claim 9 wherein the identifier is a GPS coordinate.

16. The method as in claim 9 wherein the identifier is selected from the group consisting of a physical address description, an identification code, and a GPS coordinate.

* * * * *